Figure 1:
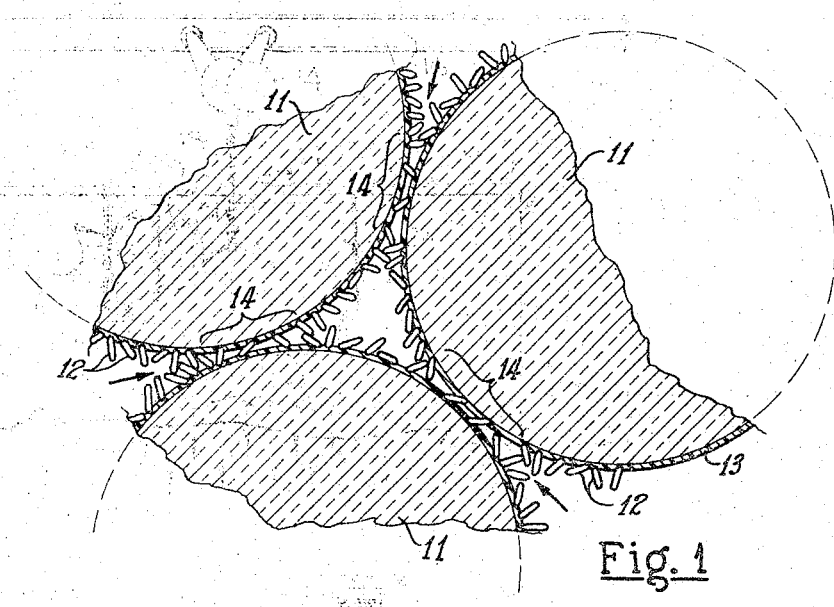

April 4, 1967 T. E. PHILIPPS ET AL 3,312,569
COMPATIBLE FIBROUS GLASS REINFORCEMENTS OF SUPERIOR
BONDING AND WETTING CHARACTERISTICS
Filed May 7, 1965

INVENTORS
THOMAS E. PHILIPPS &
BY JOHN S. WHITE

ATTORNEYS

3,312,569
COMPATIBLE FIBROUS GLASS REINFORCEMENTS OF SUPERIOR BONDING AND WETTING CHARACTERISTICS
Thomas E. Philipps, Granville, Ohio, and John S. White, Portsmouth, N.H., assignors to Owens-Corning Fiberglas Corporation, a corporation of Delaware
Filed May 7, 1965, Ser. No. 454,144
2 Claims. (Cl. 117—126)

The present application is a continuation-in-part of copending application, Ser. No. 160,526, filed Dec. 19, 1961, now abandoned.

The present invention relates to fibrous glass reinforcements for synthetic resins and methods for their preparation, and particularly to fibrous glass reinforcements which yield highly improved compatibility, wettability, bonding, and invisibility when combined with a synthetic resin.

Glass fibers in the form of mats, strands, yarns, roving and fabric are the additives predominantly utilized to impart high strengths to moldings or laminates prepared from synthetic resins. The realization of increased strengths in such composites is primarily dependent upon the attainment of mechanical and/or chemical bonding between the glass fibers and the resin which they reinforce. The continued realization of such strengths is further dependent upon the prevention of mutual abrasion between the glass fibers embedded in the resin and the exclusion of moisture at the glass-resin interface, i.e., wet strength.

The extent of the strength improvement attained is related to, and dependent upon, the degree of impregnation or penetration of the plural filament reinforcements by the impregnating resin. Specifically, if the resin thoroughly penetrates the strands or rovings to yield a composite comprising a resin containing uniformly distributed glass filaments, the strengths of the composite are maximal. This results from the fact that the resin present between the glass filaments acts as a cushioning medium which adsorbs shock and permits the fibers to align and jointly assume stresses applied to the laminate, and simultaneously prevents the mutual abrasion which results when glass fibers are permitted to contact one another. In addition, mechanical bonding is realized due to the physical intermeshing of the resin and reinforcement, unlike a glass strand which is merely enveloped or sheathed by the resin without penetration between the individual filaments which make up the strand. Finally, the filling of the voids within the strand structure precludes the formation of a capillary wick which facilitates the intrusion of moisture to the very heart of the laminate. The latter effect is compounded by the hydrophilic nature of the glass fibers.

Prior to the present invention only a fraction of the theoretical strengths of resin-glass fiber composites have been realized. Prior art reinforcements contain a thin coating termed a forming size, which conventionally comprises a film-forming resin, bonding or wetting agents such as organosilanes or Werner Chromium complexes, and lubricants. This coating is applied to the surfaces of the individual glass fibers at the time of their formation in order to prevent the attrition which would otherwise immediately result from mutual abrasion and moisture degradation. Specifically, the resin film-former provides a protective coating combatting mutual abrasion, and this effect is implemented by the lubricity supplied by the lubricants. Preferably, the resin selected as the film-former also possesses some degree of compatibility with the impregnating resin with which the reinforcement is ultimately to be combined. The function of the organosilane or chromium complex "coupling agents" is variously attributed to water-repellancy, increased wettability of the glass surface by the impregnating resin, interfacial compatibility, and chemical bonding, i.e., by serving as a linking reactant between reactive groups present upon the glass surface and in the impregnating resin.

At any rate, the foregoing conventional reinforcements fail to yield a satisfactory portion of the strengths theoretically possible with a glass-resin composite. This failure is not only demonstrated by strength tests, but also by the rate of impregnation of the reinforcements and the visibility of the reinforcements within the finished laminate. In the latter regard, the fibers remain highly visible if poor wetting is realized at the glass-resin interface due to the effects of refraction. However, when the surfaces of the glass fibers are thoroughly wetted by the resin the fibers substantially disappear.

It is an object of the present invention to provide new and improved fibrous glass reinforcements for synthetic resins.

Another object is the provision of methods for the preparation of improved fibrous glass reinforcements for synthetic resins.

Figure 2:
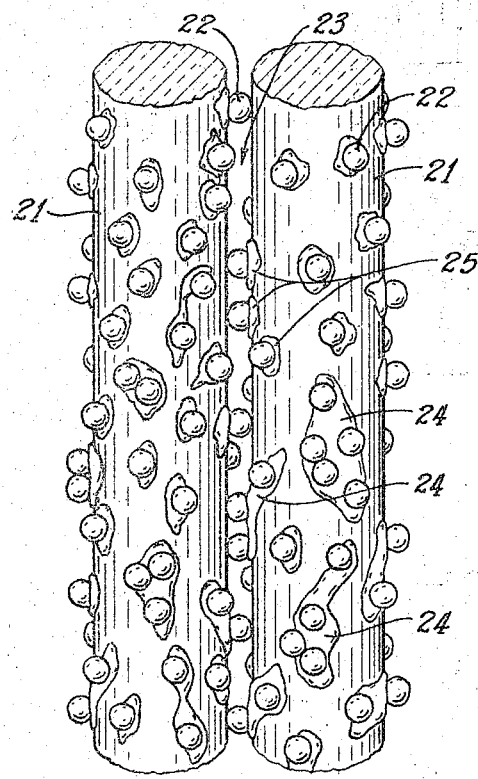

Other objects and advantages will be apparent from the detailed description which follows and from the drawings wherein:

FIGURE 1 is a fragmentary sectional view through a plurality of glass fibers of a fibrous strand treated in accordance with the invention, and FIGURE 2 is a perspective elevational view of two adjacent fibers selected from a fibrous strand treated in accordance with the invention.

The aforesaid objects are achieved by means of adhering minute particles of alumina to the surfaces of the glass fibers. Specifically, colloidal alumina having dimensions of less than 10 microns is employed, and preferably colloidal boehmite alumina fibers having a length in the range of 0.1–.25 micron and a diameter in the range of .002–.01 micron. The composition of the preferred boehmite alumina fibers is approximately as follows, wherein the quantities of the constituents are expressed in percentages by weight:

| | Percent |
|---|---|
| $AlOOH$ | 83.1 |
| $CH_3COOH$ | 9.8 |
| $SO_4$ | 1.7 |
| $H_2O$ | 5.0 |
| $NH_4$ | 0.2 |
| $Na$ | 0.07 |
| $Fe$ | 0.02 |
| $SiO_2$ | 0.02 |

The above preferred alumina fibers have surfaces modified through the adsorption of acetate ions, are cationic, and exhibit a particular affinity for the surfaces of glass fibers. Such alumina fibers are further described by U.S. 2,915,475 and 2,917,426.

It should be noted that alumina fibers or particles having dimensions generally in the colloidal range are suitable for the practice of the invention. The actual dimensions of the particles used are in part dependent upon the diameters of the glass fibers to which they are applied. Specifically, the particulate material should have a major dimension equal to no more than one-third of the diameter of the glass fibers. Since glass fibers employed in the reinforcement of synthetic resins normally have a diameter of no more than 25 microns, the major dimension of the alumina particles is usually no more than 8 microns. The glass fibers preferably have a diameter in the range of 2 to 15 microns and the alumina particles preferably have a major dimension of between 0.05–1.0 micron. In a preferred combination, alumina particles having an average major dimension of 0.25 micron are employed with glass fibers having a diameter of 10 microns, in which the particles have a major dimension equal to 1/40 of the diameter of the glass fibers. The utilization of particles having a diameter less than that of the glass fibers is dictated by the desire to achieve maximum penetration of the fibrous strands while avoiding an unfavorable resin to glass ratio in the completed laminate. Specifically, larger particles tend to position themselves in the arcuohedral voids which exist between three or more cylindrical fibers, instead of being positioned between the surfaces of two adjacent fibers which would normally contact one another in the absence of the spacing effect of the particles. In such cases, the particles impede the penetration by the resin rather than enhancing it. In addition if the particles are extremely large, penetration by the resin is so extensive as to yield an undesirably high proportion of the resin. For example a glass content of at least 50 to 60% by volume is desirable, and that content is not realized when the degree of penetration is so extensive as to yield a resin content in excess of 40 to 50% by volume.

In applying the particulate alumina to the surfaces of the glass fibers the particles are adhered to the surfaces of the glass fibers by means of a synthetic resin, and preferably a resin which is soluble in, or compatible with, the resin which the glass fibers will ultimately reinforce.

In the reinforcement of unsaturated polyesters or styrene-unsaturated polyester systems which presently represent the preponderance of glass fiber reinforced synthetic resins, a saturated polyester is preferred as the adhesive for the alumina particles. Such saturated polyesters may be prepared by reacting a dibasic acid including the anhydrides of such acids, and a dihydric alcohol. The preparation of a preferred saturated polyester is set forth in the following example:

EXAMPLE 1

24 parts by weight of succinic anhydride, 36 parts by weight of phthalic anhydride, 40 parts by weight of propylene glycol and .08 part by weight of triphenyl phosphite are placed in a closed reactor. These materials are reacted for 8 hours at 165° C. and thereafter at 200° C. until an acid number of 40 is reached. Nitrogen is bubbled through the reaction mixture throughout the reaction. The resultant resin is diluted with acetone to provide a solution containing 50% solids which is suitable for dispersion in an aqueous phase after emulsification with ammonium hydroxide.

Similar saturated polyesters may be prepared from other dibasic acids or anhydrides such as adipic, oxalic, malonic or glutaric acids or their anhydrides, and other dihydric alcohols such as ethylene glycol, triethylene glycol, butylene glycol, polyethylene glycol, and the like. Examples of other saturated polyesters of this type are provided by U.S. 2,801,189.

Other adhesives for the alumina particles which are suitable for the reinforcement of polyester resins include polyvinyl acetate, polyvinyl alcohol, polyvinyl pyrrolidone, acrylic resins, etc.

When the glass fibers are to be employed in the reinforcement of an epoxy resin, the alumina particles are preferably adhered to the glass surface by means of one of the following resins: incompletely cured epoxy resins, e.g., when an amine curing agent is employed it is employed in quantities less than adequate to cure the epoxy resin; phenolformaldehyde resins; melamine resins; polyamide resins; and the like.

When resins other than polyesters or epoxy resins are to be reinforced, the adhesive may be selected for its compatibility with the specific resin to be reinforced, e.g., polyamide-phenolic, epoxyphenylene oxide, etc.

It should also be realized that various combinations or mixtures of the above resins may be employed. In addition, the resins or mixtures of resins employed to adhere the alumina particles to the glass surface may contain additives conventionally employed in sizes for glass fibers such as coupling agents, lubricants, emulsifiers, and the like. Werner chromium complexes or organosilanes are conventional coupling agents and the latter are preferred.

The organosilane coupling agents have the general formula:

$$R_n-Si-X_{4-n}$$

wherein R is an organic group which provides compatibility, organophilicity, or reactivity with superimposed laminating or impregnating resins and which is normally selected from the group consisting of carboxy, glycidoxy, alkenyl, alkyl or aminoalkyl groups such as acrylato, methacrylato, vinyl, allyl, methallyl, glycidoxy, epoxy, crotyl, stearyl, ethyl, propyl, etc., X is a hydrolyzable group as such as halogen, alkoxy, aryloxy, amino, etc. or a hydroxy group and $n$ is an integer having a value from 1 to 3. When the resin to be reinforced is an unsaturated polyester the carboxy or alkenyl silanes are preferred, e.g., gamma methacryloxy, propyl trimethoxy silane, vinyl tris beta (methoxy ethoxy)silane, vinyl trichloro silane, etc. When the resin to be reinforced is an epoxy resin, the amino or epoxy silanes are preferred, e.g., gamma amino propyl triethoxy silane; glycidoxypropyl trimethoxy silane; beta (3,4 epoxy cyclohexyl) ethyl trimethoxy silane; and the like. In addition, these organosilanes may be employed in their hydrolysed form, i.e., the hydrolyzable groups X may be hydrolysed to form hydroxyl groups and in the course of such hydrolysis some intercondensation may occur between the hydroxyl groups with the splitting off of water.

As lubricants, cationic amines, e.g., the condensates of amines and fatty acids such as stearic and pelargonic acids, are preferred due to their affinity for the glass surface. However, other lubricants such as vegetable, animal or mineral oils, polyalkylene glycols and the like may also be employed.

Similarly, emulsifiers such as ammonium hydroxide, protective colloids such as polyvinyl alcohols and stabilizers such as organic and inorganic acids, may also be employed in the compositions of the invention. For example, when saturated polyesters are employed as the adhesive, ammonium hydroxide is preferred as an emulsifier for that resin while the use of polyvinyl alcohol as a protective colloid serves to prevent the excessive agglomeration of the resin particles.

It should be noted that the use of conventional additives such as coupling agents, lubricants, etc., do not constitute a part of the fundamental invention which involves the adhesion of alumina particles to the glass surfaces and the attendant spacing effect and improved penetration. Instead, these ingredients perform their conventional function of coupling, imparting water repellancy, lubricity, etc.

The ingredients of the inventive compositions are preferably employed in the following proportional ranges which are expressed in percentages by weight:

| | Percent |
|---|---|
| Particulate alumina | 0.05–5.0 |
| Synthetic resin adhesive | 1–7 |
| Organosilane coupling agent | 0.2–3 |
| Water | Remainder |

When coupling agents and/or lubricants are employed they are preferably utilized in quantities of no more than 3% by weight and 2% by weight, respectively. The above percentages on a dry solids basis, give coatings of the following compositions: particulate alumina, 0.5–80.5%; synthetic resin adhesive, 11.1–97.6%; coupling agent, 1.64–74%.

A preferred coating system is set forth in the following example in which quantities of ingredients are expressed as percentages by weight:

EXAMPLE 2

| | Percent |
|---|---|
| Reaction product of Example 1 | 2.65 |
| Colloidal boehmite alumina (average major dimension of 0.25 micron) | 0.3 |
| Gamma methacryloxy propyl trimethoxy silane | 0.5 |
| Tetraethylene amine-stearic acid condensate | 0.11 |
| Polyvinyl alcohol | 0.755 |
| Ammonium hydroxide | 0.3 |
| Water | Remainder |

The above ingredients are formulated by heating the resin until fluid, emulsifying it by means of the ammonium hydroxide, and then adding an aqueous dispersion of the remaining ingredients to the emulsified resin with agitation. The pH is then adjusted to between 2 to 5, and preferably between 3–4, by means of the addition of an acid such as acetic acid. The resultant size composition was then applied at forming to glass fibers having an average diameter of .10 microns by means of conventional application methods.

While apron applicators such as that disclosed by U.S. 2,873,718 are preferred, other conventional contact, immersion or spray applicators such as the pad applicators of U.S. 2,390,370 and 2,778,764; the transfer rolls of U.S. 2,693,429 and 2,742,737; the immersion technique of U.S. 2,732,883; or the spray methods of U.S. 2,846,348 and 2,906,470, may also be utilized. By such methods, quantities of the solids of the size compositions normally comprising less than 10% by weight of the fiber-coating composite, and preferably between 0.5–4% by weight, are applied to the surfaces of the glass fibers at the rapid rates at which glass fibers are conventionally formed.

It should be noted that while the reinforcements are attenuated or formed as a plurality of glass fibers, the treating compositions of the invention are applied to the surfaces of the individual fibers before they are grouped together into a strand or similar plural filament structure. If this is not done, e.g., if the coating is applied to the grouped plural filaments, the filaments at the interior of the strand are devoid of particles upon their surfaces and neither the spacing effect nor improved penetration are realized. This is achieved by contacting the individual filaments with the coating prior to grouping them together, e.g., as shown in FIGURE 2 of U.S. 2,742,737.

Other forming size compositions are provided by the following examples:

EXAMPLE 3

| | Percent |
|---|---|
| Liquid epoxy resin | 1.8 |
| Colloidal gamma alumina | 0.5 |
| Glycidoxy propyl trimethoxy silane | 0.3 |
| Amide lubricant (mixture of mono- and di-substituted amides prepared by treating unsubstituted amides with ethylene oxide) | 0.2 |
| Water | Remainder |

The above ingredients were compounded by dispersing the epoxy resins in water with agitation, adding an aqueous solution of the amide containing a trace of acetic acid with further agitation, adding the silane to the emulsion and stirring for an additional 30 minutes.

The liquid epoxy resin of the above example has the following approximate chemical structure:

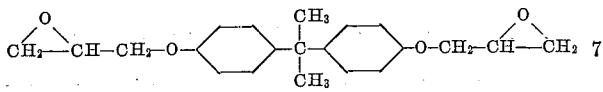

an epoxide equivalent weight of 179, a viscosity of 6200 centipoise and a maximum Gardner color of 1. It was also devoid of a curing agent.

EXAMPLE 4

Example 3 was repeated with the substitution of 0.4% by weight of gamma amino propyl triethoxy silane for the glycidoxy silane, and increasing the quantity of the liquid epoxy resin to 3.1% by weight.

EXAMPLE 5

| | Percent |
|---|---|
| Polyamide resin | 5.0 |
| Colloidal boehmite alumina | 0.3 |
| Chloropropyl trimethoxysilane | 0.2 |
| Cetyl dimethyl benzyl ammonium chloride lubricant | 0.1 |
| Water | Remainder |

The above ingredients were formulated by diluting the polyamide with the water and adding the silane and lubricant with agitation. The polyamide was prepared as a suspensoid by reacting an admixture of equal parts of dimerized and trimerized linoleic and linolenic acid with ethylene diamine.

The compositions of Examples 3–5 may also be applied to glass fibers by means of the methods and apparatus described in Example 2.

In employing the glass fibers treated in accordance with the invention, it has been found that laminates of increased strength are derived, that the reinforcements wet out more rapidly to reduce fabrication time and expense in laminating or molding, that laminates of better appearance are obtained due to the more thorough wetting out of the glass fibers and their consequently reduced visibility within the laminate, and that higher glass contents may be employed to further increase the strengths of the laminates.

Before discussing the above improvements some mention of the theoretical mechanism which may provide these improvements should be made. It is believed that when a structure comprising a plurality of substantially parallel glass fibers, such as a strand, yarn, roving or chopped segments of such structures, is treated in accordance with the invention, the alumina particles function as physical wedges, spacers or spreaders which space or spread apart adjacent filaments and thereby render the strand highly susceptible to penetration by the impregnating resin. This would account not only for the increased rate of wetting and thoroughness of wetting which are supported by the following data, but also for the near invisibility of the glass fibers within the laminate. In turn, both the physical penetration of the strand by the resin, and the lateral projections provided by the alumina particles, would yield improved mechanical bonding and the consequently increased laminate strengths which are realized.

These improvements are best discussed and understood in relation to the accompanying drawings.

As shown in FIGURE 1, the glass fibers 11 possess laterally projecting particles 12, which take the form of minute fibers in this case, and are adhered to the surface of the glass fibers 11 by means of a synthetic resin adhesive phase 13 which simultaneously serves as a protective or abrasion resistant sheath for the glass fibers 11. As shown at the areas of closest proximity 14 of the adjacent fibers, the particles 12 present in those areas serve to space the adjacent fibers 11 and to prevent the face to face contact or abutting engagement of both the adhesive phase 13, and of the fibers 11. Consequently, the penetration of the impregnating resin along the paths indicated by arrows in the drawing, is greatly enhanced. Such flow or penetration may also be further facilitated by the solubility or compatibility of the impregnating resin with the resin which is employed as the adhesive phase 13. Such compatibility or wetting characteristics may also be enhanced by means of the incorporation of coupling or wetting agents such an organosilanes in the adhesive phase 13.

FIGURE 2 depicts two adjacent glass fibers 21 which are spaced apart by roughly spherical particles 22, at the area of closest proximity. This provides spacing 23 for the passage or penetration of the impregnating or laminating resin. FIGURE 2 is also employed to illustrate various forms of adhesion which may be employed in that some particles are adhered by means of a resinous film 24, while others are adhered by means of resin particles 25. The latter form of adhesion may be achieved by means of a colloidal dispersion or emulsion of the resin adhesive.

To illustrate the improvements yielded by the present invention, a series of tests were conducted to yield the following data:

I.—Strength improvements

Since the inventive improvements are best illustrated in terms of laminate properties, fibrous glass rovings sized with the composition of Example 2 were woven and compared in polyester laminates with rovings sized with (a) polyvinyl acetate and vinyl tris beta (methoxy ethoxy) silane, and (b) polyvinyl acetate and the deionized hydrolysis product of sodium vinyl siloxanolate, the two products predominantly employed in the reinforcement of polyester resins. The following flexural and compressive strengths were obtained:

TABLE 1

| Size Composition | Flexural strength (p.s.i.) | | Compressive strength |
|---|---|---|---|
| | Dry | After 2 hour immersion in boiling water | |
| Composition of Example 2 | 71,600 | 62,900 | 43,200 |
| PVAc-vinyl silane | 54,500 | 45,600 | 31,900 |
| PVAc-sodium vinyl siloxanolate | 56,200 | 38,500 | 34,500 |

It should be noted that the materials of the invention yield improvements of as much as 31.4% in dry flexural strengths, 63% in wet flexural strengths and 35% in compressive strengths.

Each figure in the above table represents an average derived by testing three different specimens of each sample. Each laminate comprised 4 parallel plies of woven 60 end roving (double 30 end roving in the fill) in a 5 warp × 4 fill construction, fully impregnated with 92% unsaturated polyester, 7% styrene and 1% benzoyl peroxide, and cured for 30 minutes at 235° F. in a 10" × 10" × ⅛" jig.

Still further, reinforcements treated in accordance with the invention permit even greater strength improvements. Specifically, the improved penetration of the reinforcements permits the use of higher reinforcement contents in composites in which the individual fibers are uniformly dispersed in the resin. In the case of conventional reinforcements the difficulty of penetration increases as the reinforcement content increases and the occurrence of weak areas comprising a high proportion of resin similarly increases. Table 2 below demonstrates this improvement in comparing laminates containing the inventive and conventional reinforcements in increasing proportions:

TABLE 2

| Number of Plies Of Woven Glass Fiber Roving | Composition of Example 2 | | PVAc-vinyl silane size composition | |
|---|---|---|---|---|
| | Flexural Strength (p.s.i.) | Flexural Strength Per Ply Of Reinforcement | Flexural Strength (p.s.i.) | Flexural Strength Per Ply Of Reinforcement |
| 4 | 71,600 | 17,900 | 54,500 | 13,625 |
| 5 | 91,800 | 18,360 | 64,000 | 12,800 |
| 7 | 93,300 | 13,328 | 67,100 | 9,585 |

On the basis of the above data it may be seen that reinforcements treated in accordance with the invention not only yield higher strength, but that higher overall strengths may be achieved since the increased wettability of the reinforcements permits a higher glass content without a reduction in the strength provided by the reinforcements.

The laminates of Table 2 were prepared in the same manner as those of Table 1, with the addition of further plies of reinforcement.

To indicate strength improvements derived when the inventive materials are employed as reinforcements in forms other than woven roving, laminates containing ½-inch chopped segments of rovings treated in accordance with the invention were prepared to provide the data set forth in Table 3, below:

TABLE 3

| | Chopped Roving Sized With PVAc-Vinyl Silane | Chopped Roving Sized With Composition of Example 2 | Percent Increase |
|---|---|---|---|
| Dry Flexural Strength (p.s.i.) | 21,400 | 34,700 | 62 |
| Wet Flexural Strength After 2 Hour Boil (p.s.i.) | 18,200 | 28,500 | 56 |
| Compressive Strength (p.s.i.) | 22,800 | 31,700 | 39 |

To obtain the above data, boxes were molded from polyester resin pre-mixes containing 26% by weight of the prescribed chopped rovings in a matched metal molding method.

II.—Laminate clarity

The improvement in laminate clarity provided by fibrous glass reinforcements treated in accordance with the invention is best demonstrated by a visual examination and comparison of laminates containing the inventive and conventional reinforcements. Under such scrutiny, the conventional reinforcements are readily apparent and lend a cloudy or hazy appearance to the laminates while the inventive reinforcements are substantially transparent. However, a numerical expression of this improvement is provided by Table 4 which sets forth the percentage of incandescent light which is transmitted through equal quantities of the inventive and conventional reinforcements which have been impregnated with equal quantities of the same resin. The readings (percentage of light transmitted through the impregnated reinforcements) were commenced upon impregnation and repeated at 15-second intervals.

TABLE 4

| Reinforcement Sized With— | Percentage of Light Transmitted At Following Intervals (Seconds) After Impregnation | | | | | | | | |
|---|---|---|---|---|---|---|---|---|---|
| | 1 | 15 | 30 | 45 | 60 | 75 | 90 | 105 | 120 |
| Composition of Example 2 | 15 | 15 | 30 | 52 | 66 | 74 | 78 | 80 | 80 |
| PVAc-vinyl silane | 0 | 11 | 25 | 38 | 50 | 60 | 66 | 70 | 72 |
| PVAc-sodium vinyl siloxanolate | 5 | 5 | 10 | 21 | 32 | 40 | 48 | 55 | 60 |

It should be noted that laminate clarity is also an indication of the degree of penetration of the fibrous reinforcements and the extent of the wetting out of the surfaces of the glass fibers.

III.—Rapidity of wetting out and impregnation

Since the rate of impregnation directly influences the time required for the preparation and molding of a given laminate, increases in this rate yield processing and economic improvements. The rapidity of impregnation of the inventive materials is demonstrated by Table 5 below, as derived from the slope of the transmitted light curve:

TABLE 5

| Reinforcements Sized With— | Maximum Impregnation Rate (1–10) | Interval After Impregnation Before Maximum Rate Is Achieved, Seconds |
|---|---|---|
| Composition of Example 2 | 6.9 | 27 |
| PVAc-vinyl silane | 3.2 | 54 |
| PVAc-sodium vinyl siloxanolate | 2.7 | 36 |

From the above data it may be perceived that the inventive materials are capable of being impregnated at a rate which is 216% and 255% as great as that of conventional reinforcements, and that the maximum rate of impregnation is achieved in one-half and three-quarters of the time required for conventional reinforcements.

It should be realized that the methods of the invention may be applied to any plural glass fiber structure such as strands, yarns, staple yarns, roving, woven roving, fabrics, tapes, etc., as well as chopped strands, yarns, staple yarns, rovings or fabrics, and mats and preforms formed from chopped strands, yarns or rovings.

It is apparent that novel fibrous glass reinforcements and methods for their preparation are provided by the present invention. It is further obvious that various changes, alterations and substitutions may be made in the products and methods of the invention, without departing from the spirit of the invention as defined by the following claims:

We claim:
1. Coated glass fibers capable of effecting a bond with a polymerizable resin, and having a coating comprising: from between approximately 0.5% to 80.5% by weight of colloidal boehmite alumina particles, between approximately 1.64% to approximately 74.0 by weight of an organo silane coupling agent, and between approximately 11% to 97.6% by weight of a resin from the group consisting of: polyvinyl acetate, polyvinyl alcohol, polyvinyl pyrrolidone, acrylic resins, epoxy resins, polyamide resins, and polyester resins; and wherein some molecules of the organo silane have their inorganic portion attached to the glass with their organic portion projecting away from the glass, while other molecules have their inorganic portion attached to the boehmite particles with their organic portion positioned generally between the organic portions of the molecules attached to the glass; and the resin is positioned between said organic portions without being cross-linked thereto.

2. Coated glass fibers capable of effecting a bond with a polymerizable resin, and having a coating comprising: from between approximately 0.5% to approximately 80.5% by weight of colloidal boehmite alumina particles, between approximately 1.64% to approximately 74% by weight of an organo silane coupling agent, approximately between 11% to approximately 97.6% by weight of a synthetic resin adhesive; and wherein some molecules of the organo silane have their inorganic portion attached to the glass with their organic portion projecting away from the glass, while other molecules have their inorganic portion attached to the boehmite with their organic portion positioned generally between the organic portions of the molecules attached to the glass; and the resin is positioned between said organic portions without being cross-linked thereto.

References Cited by the Examiner

UNITED STATES PATENTS

| 2,778,763 | 1/1957 | Novak | 117—126 |
| 2,801,189 | 7/1957 | Collier | 117—126 |
| 2,917,426 | 12/1959 | Bugosh | 117—126 |
| 3,013,901 | 12/1961 | Bugosh | 117—76 |
| 3,013,902 | 12/1961 | Bugosh | 117—126 |

ALFRED L. LEAVITT, *Primary Examiner.*

RICHARD D. NEVIUS, *Examiner.*

A. GOLIAN, *Assistant Examiner.*